(12) United States Patent
Mishima

(10) Patent No.: US 11,782,128 B2
(45) Date of Patent: Oct. 10, 2023

(54) RADAR APPARATUS, GHOST DECISION METHOD, AND COMPUTER-READABLE RECORDING MEDIUM

(71) Applicant: OMRON Corporation, Kyoto (JP)

(72) Inventor: Kazuma Mishima, Muko (JP)

(73) Assignee: OMRON Corporation, Kyoto (JP)

(*) Notice: Subject to any disclaimer, the term of this patent is extended or adjusted under 35 U.S.C. 154(b) by 282 days.

(21) Appl. No.: 16/809,462

(22) Filed: Mar. 4, 2020

(65) Prior Publication Data

US 2021/0003667 A1 Jan. 7, 2021

(30) Foreign Application Priority Data

Jul. 5, 2019 (JP) .................................. 2019-126447

(51) Int. Cl.
*G01S 7/41* (2006.01)
*G01S 13/42* (2006.01)

(52) U.S. Cl.
CPC ............... *G01S 7/411* (2013.01); *G01S 13/42* (2013.01)

(58) Field of Classification Search
CPC .... G01S 7/411; G01S 13/42; G10K 2210/505
See application file for complete search history.

(56) References Cited

U.S. PATENT DOCUMENTS

| | | | |
|---|---|---|---|
| 5,200,901 A * | 4/1993 | Gerstenfeld | G01S 13/91 701/120 |
| 6,323,802 B1 * | 11/2001 | Tokoro | G01S 13/931 342/70 |
| 6,693,583 B2 * | 2/2004 | Tamatsu | G01S 7/354 180/169 |
| 2018/0341012 A1 * | 11/2018 | Takada | G01S 7/415 |

FOREIGN PATENT DOCUMENTS

| | | | | |
|---|---|---|---|---|
| GB | 2500107 A | * | 9/2013 | .......... G01S 15/107 |
| JP | 2013-167554 A | | 8/2013 | |
| JP | 2016-148547 A | | 8/2016 | |
| JP | 2018-200173 A | | 12/2018 | |

OTHER PUBLICATIONS

Vermesan, I., Carsenat, D., Decroze, C. and Reynaud, S., 2013. Ghost image cancellation algorithm through numeric beamforming for multi-antenna radar imaging. IET Radar, Sonar & Navigation, 7(5), pp. 480-488. (Year: 2013).*
Office Action (JPOA) dated Mar. 22, 2023 in a counterpart Japanese patent application, with English translation.

* cited by examiner

Primary Examiner — Bernarr E Gregory
Assistant Examiner — Yonghong Li
(74) Attorney, Agent, or Firm — METROLEX IP LAW GROUP, PLLC

(57) ABSTRACT

In a radar apparatus of the present invention, a ghost deciding unit decides whether or not a first condition that a first object candidate and a second object candidate are in the same direction with respect to the transmission/reception unit is satisfied, and then decides whether or not a second condition that, of the first and second object candidates, a reflection power from the first object candidate located farther away from the transmission/reception unit is smaller than a reflection power from the second object candidate located closer to the transmission/reception unit is satisfied. The ghost deciding unit decides that only when the first condition and the second condition are satisfied, the first object candidate is a ghost.

5 Claims, 11 Drawing Sheets

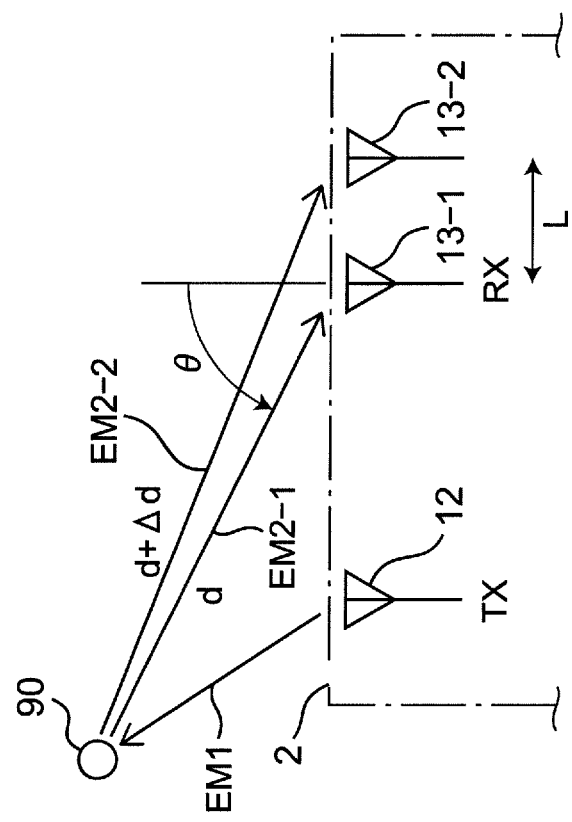
*Fig.2C*
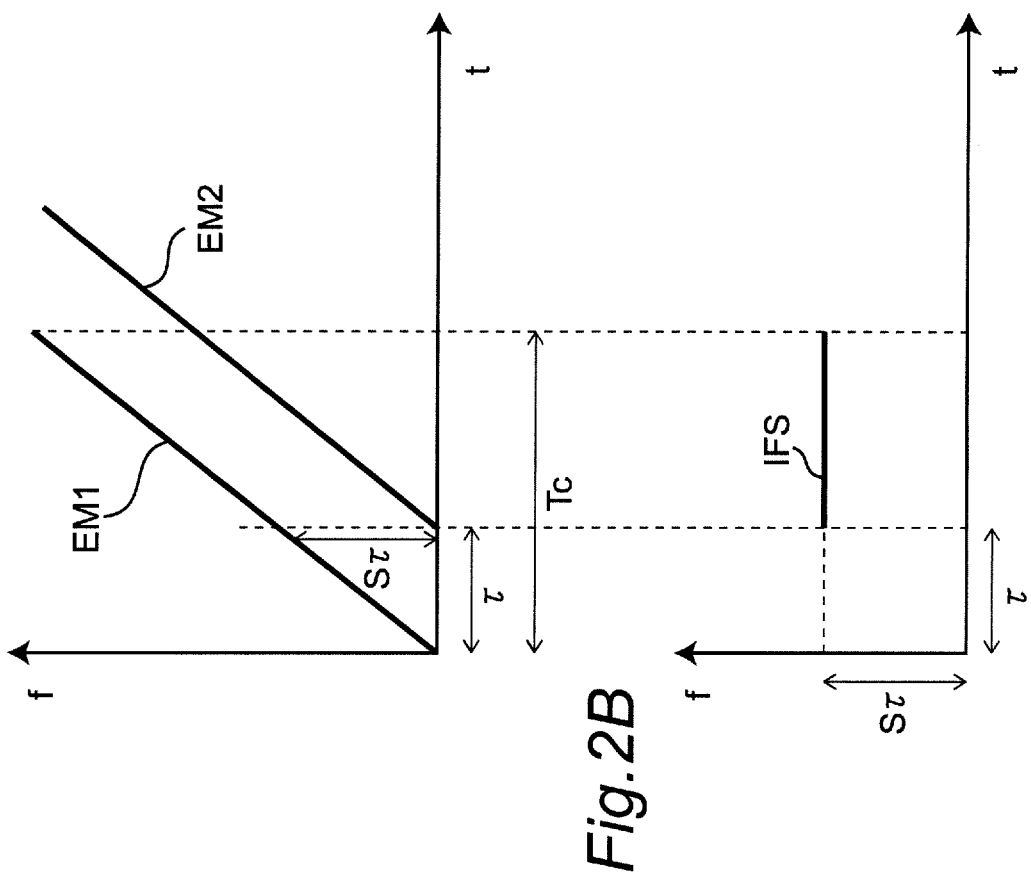
*Fig.2A*
*Fig.2B*

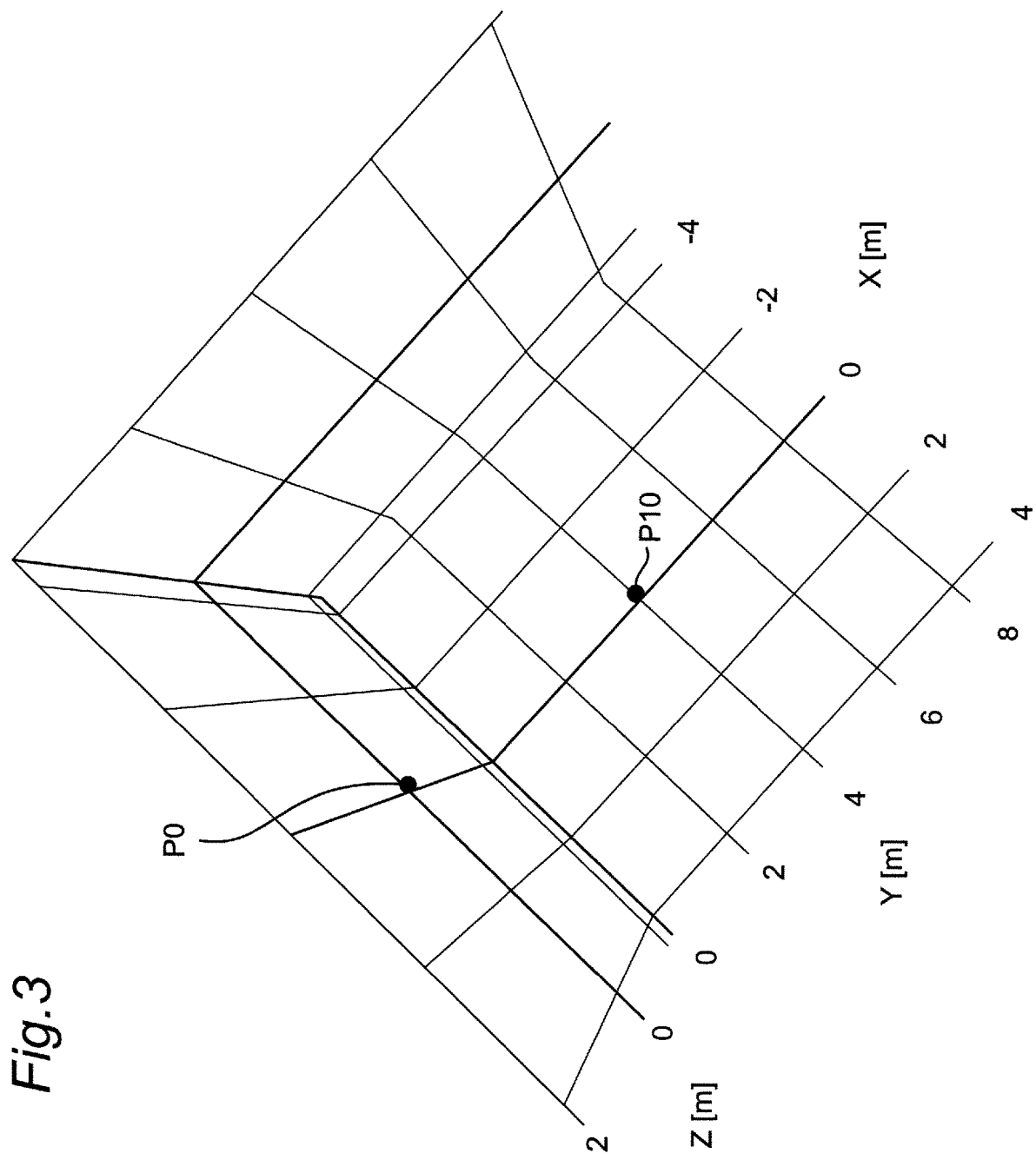

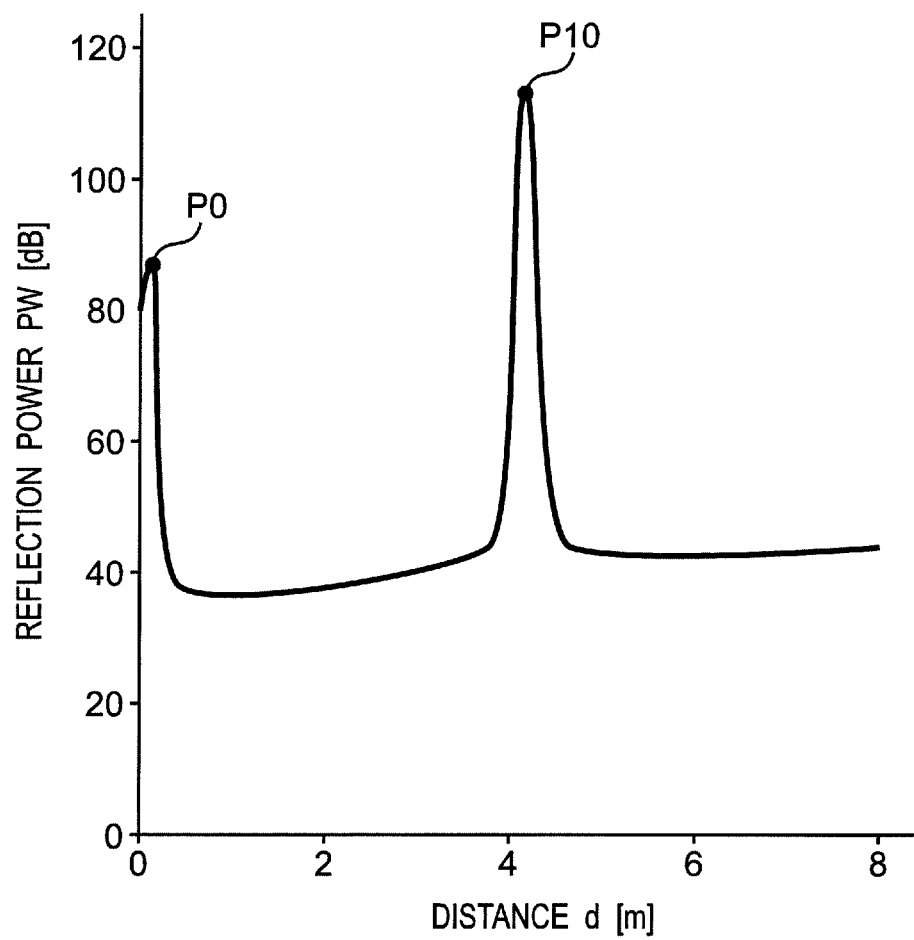

RADAR APPARATUS, GHOST DECISION METHOD, AND COMPUTER-READABLE RECORDING MEDIUM

CROSS-REFERENCE TO RELATED APPLICATION

This application is based on an application No. 2019-126447 filed in Japan on Jul. 5, 2019, the entire content of which is hereby incorporated by reference.

TECHNICAL FIELD

The present invention relates to a radar apparatus, and more particularly, to an apparatus for measuring a distance and a direction to an object by emitting an electromagnetic wave toward the object and observing a reflected wave from the object. Further, the present invention relates to a ghost decision method for deciding whether or not an object (object candidate) observed by such a radar apparatus is a ghost. Further, the present invention relates to a computer-readable recording medium storing a program for causing a computer to execute such a ghost decision method.

BACKGROUND ART

Conventionally, as this type of radar apparatus, for example, as disclosed in Patent Document 1 (Japanese Patent Application Laid-Open No. 2013-167554), the one that specifies a position of an object by emitting a radar wave and receiving a reflected wave of the radar wave reflected by the object is known.

SUMMARY OF THE INVENTION

When a reflected wave from the object reaches the radar apparatus through multipath (generated by the presence of a reflecting wall and the like), a ghost may be included as an object observed by the radar apparatus. Here, the ghost means a result (or erroneously detected data) of having erroneously detected the object (object) as if it had existed even though it does not exist (hereinafter, the observed object is appropriately referred to as an "object candidate" in consideration of the possibility that the observed object is a ghost.) For this reason, in order to increase the detection accuracy of the radar apparatus, it is desirable to be able to decide whether or not each observed object candidate is a ghost.

Therefore, an object of the present invention is to provide a radar apparatus capable of deciding whether or not an observed object candidate is a ghost. Another object of the present invention is to provide a ghost decision method capable of deciding whether or not an object candidate observed by such a radar apparatus is a ghost. Another object of the present invention is to provide a computer-readable recording medium storing a program for causing a computer to execute such a ghost decision method.

In order to solve the above-described problems, the radar apparatus according to the present disclosure is a radar apparatus that measures a distance and a direction from a transmission/reception unit to an object by emitting an electromagnetic wave from the transmission/reception unit toward the object and observing a reflected wave from the object, the radar apparatus including:
 a candidate specifying unit that obtains a distance, a direction, and a reflection power of each object candidate with respect to the transmission/reception unit based on the reflected wave; and
 a ghost deciding unit that decides whether or not each object candidate is a ghost, in which the ghost deciding unit includes:
 a first decision unit that decides whether or not a first condition that a first object candidate and a second object candidate are in the same direction with respect to the transmission/reception unit is satisfied, and
 a second decision unit that decides whether or not a second condition that, of the first and second object candidates, a reflection power from the first object candidate located farther away from the transmission/reception unit is smaller than a reflection power from the second object candidate located closer to the transmission/reception unit is satisfied, and
 decides that only when the first condition and the second condition are satisfied, the first object candidate is a ghost.

In this specification, a "radar apparatus" generally means an apparatus that measures a distance and a direction to an object by emitting an electromagnetic wave toward the object and observing a reflected wave from the object. In the present invention, the electromagnetic wave is typically a millimeter wave or a microwave, but is not limited thereto, and may have a longer wavelength or a shorter wavelength (for example, light).

"Ghost" means a result (or erroneously detected data) of having erroneously detected an object as if it had existed even though it does not exist. For example, a ghost occurs when a reflected wave from an object reaches a radar apparatus through multipath (caused by the presence of a reflecting wall or the like).

In another aspect, the ghost decision method of the present disclosure is a ghost decision method for a radar apparatus that measures a distance and a direction from a transmission/reception unit to an object by emitting an electromagnetic wave from the transmission/reception unit toward the object and observing a reflected wave from the object, in which
 the radar apparatus includes a candidate specifying unit that obtains, based on the reflected wave, a distance, a direction, and a reflection power of each object candidate with respect to the transmission/reception unit,
 the ghost decision method
 decides whether or not a first condition that a first object candidate and a second object candidate are in the same direction with respect to the transmission/reception unit is satisfied,
 decides whether or not a second condition that of the first and second object candidates, a reflection power from the first object candidate located farther away from the transmission/reception unit is smaller than a reflection power from the second object candidate located closer to the transmission/reception unit is satisfied, and
 decides that only when the first condition and the second condition are satisfied, the first object candidate is a ghost, and
 thereby decides whether or not each of the object candidates corresponds to a ghost as the first object candidate.

In yet another aspect, a computer-readable recording medium according to the present disclosure is a computer-readable recording medium non-transitorily storing a program for causing a computer to execute the ghost decision method.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A and 2B are diagrams illustrating the principle by which the radar apparatus measures the distance from a radar transmission/reception unit to an object. FIG. 2C is a diagram illustrating the principle by which the radar apparatus measures the direction of an object with respect to the radar transmission/reception unit.

FIG. 3 is a diagram showing a normal observation result (not including ghost) by a radar data processing unit as a candidate specifying unit of the radar apparatus.

FIG. 4 is a diagram showing the reflection power (power summed in the angular direction) observed according to the distance from the radar transmission/reception unit when the observation result of FIG. 3 is obtained.

DESCRIPTION OF EMBODIMENTS

Hereinafter, embodiments of the present invention will be described in detail with reference to the drawings.
(Configuration of Radar Apparatus)

Figure 1:
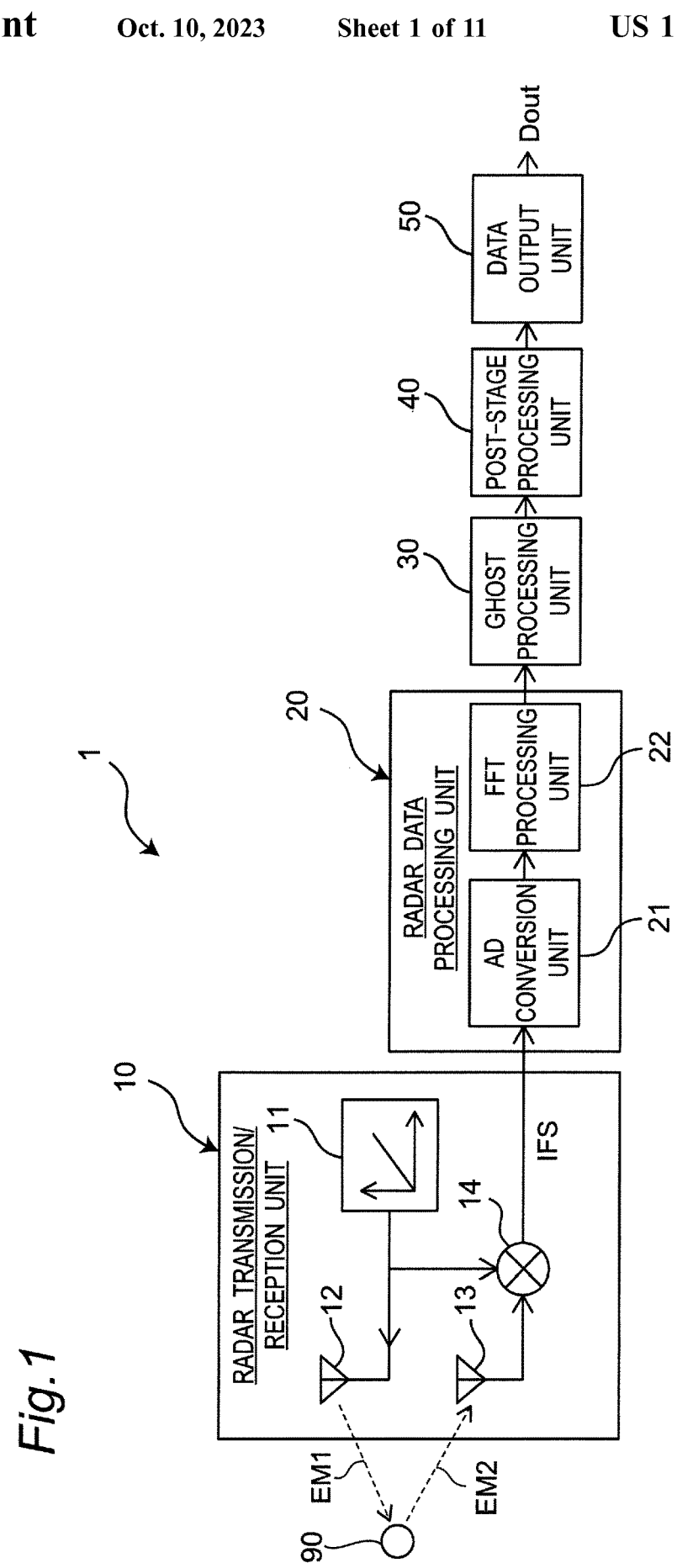
FIG. 1 is a diagram showing a block configuration of a radar apparatus according to an embodiment of the present invention.

FIG. 1 shows a block configuration of a radar apparatus (indicated by reference numeral 1) according to an embodiment of the present invention. The radar apparatus 1 includes a radar transmission/reception unit 10 as a transmission/reception unit, a radar data processing unit 20 as a candidate specifying unit, a ghost processing unit 30 as a ghost deciding unit and a ghost removing unit, a post-stage processing unit 40, and a data output unit 50.

The radar transmission/reception unit 10 includes a synthesizer 11 that generates a chirp signal (described later), a transmission antenna 12 that emits (transmits) the chirp signal generated by the synthesizer 11 toward an object 90 as an electromagnetic wave EM1, a reception antenna 13 that receives a reflected wave EM2 by the object 90, and a mixer 14 that generates an intermediate frequency signal IFS by mixing a transmission signal EM1 (for easy understanding, represented by the same reference numeral as an electromagnetic wave to be transmitted) transmitted by the transmission antenna 12, and a reception signal EM2 (for easy understanding, represented by the same reference numeral as the reflected wave) received by the reception antenna 13.

As shown in FIG. 2A, in this example, the transmission signal (chirp signal) EM1 is a signal whose frequency f monotonically increases for a certain duration Tc (Tc=40 μs in this example). In this example, the frequency f of the transmission signal EM1 increases from the start frequency of 77 GHz to 81 GHz at a change rate of 100 MHz/μs. In this example, the reception signal EM2 rises with a delay time τ from the start of transmission of the transmission signal EM1. The delay time τ is expressed as τ=2d/c by the distance (d) between the radar transmission/reception unit 10 and the object 90. Here, is the speed of light. That is, the distance d between the radar transmission/reception unit 10 and the object 90 is obtained as $$d = \tau c / 2 \qquad \text{(Eq. 1)}.$$

Like the frequency f of the transmission signal EM1, the frequency f of the reception signal EM2 increases from the start frequency of 77 GHz to 81 GHz at a change rate of 100 MHz/μs. The frequency difference Sτ between the transmission signal EM1 and the reception signal EM2 is a value proportional to the delay time τ.

As shown in FIG. 2B, the mixer 14 mixes the transmission signal EM1 and the reception signal EM2 to generate an intermediate frequency signal IFS. The frequency (intermediate frequency) of the signal IFS corresponds to the frequency difference Sτ between the transmission signal EM1 and the reception signal EM2, and is therefore a value proportional to the delay time τ. Note that the period during which the signal IFS is obtained is a period in which the transmission signal EM1 and the reception signal EM2 are superimposed (in FIG. 2B, a period between two vertical broken lines).

In this example, the transmission antenna 12 and the reception antenna 13 shown in FIG. 1 are provided in plurality respectively in order to detect the direction of the object 90 with respect to the radar transmission/reception unit 10 in the horizontal plane. To explain with a simple example, for example, as shown in FIG. 2C, it is assumed that one transmission antenna 12 and two reception antennas 13 (represented by reference numerals 13-1 and 13-2, respectively) are arranged separately from each other in the horizontal direction on the common substrate 2. The two reception antennas 13-1 and 13-2 are separated from each other by a distance L in the horizontal direction. The distance between the object 90 and the reception antenna 13-1 is expressed as d, and the distance between the object 90 and the reception antenna 13-2 is expressed as (d+Δd). This distance difference Δd causes a phase difference ΔΦ between a reception signal EM2-1 obtained by the reception antenna 13-1 and a reception signal EM2-2 obtained by the reception antenna 13-2. Assuming a flat wavefront (wavelength λ) as the reception signal EM2, the phase difference ΔΦ=2ηΔd/λ is expressed. Assuming that the direction of the object 90 with respect to the radar transmission/reception unit 10 in the horizontal plane (the angle with respect to the front of the radar transmission/reception unit 10) is θ, Δd=L sin(θ), so the direction θ is obtained as $$\theta = \sin^{-1}(\lambda \Delta \Phi / 2\pi L) \quad \text{(Eq. 2)}.$$

In this example, actually, three transmission antennas 12 and four reception antennas 13 are arranged on the substrate 2 so as to be separated from each other in the horizontal direction. As a result, the direction θ of the object 90 in the horizontal plane with respect to the radar transmission/reception unit 10 is accurately obtained in a wide range (in this example, a field of view of ±90°).

The radar data processing unit 20 shown in FIG. 1 includes a low-pass filter (not shown) that extracts an intermediate frequency signal IFS from the output of the mixer 14, an analog to digital (AD) conversion unit 21 that converts the extracted signal IFS from an analog signal to a digital signal, and a Fast Fourier Transform (FFT) processing unit 22 that performs Fourier transform processing. The radar data processing unit 20 obtains a distance d, a direction θ, and a reflection power PW of each object (object candidate) 90 with respect to the radar transmission/reception unit 10. The observed object 90 is appropriately referred to as "object candidate" in consideration of the possibility that the observed object 90 is a ghost.

Specifically, if a plurality of objects 90 exist in the field of view of the radar transmission/reception unit 10, the signals IFS extracted from the output of the mixer 14 indicate frequencies different from each other (frequency difference Sτ, this is called "tone") for every distance d between the radar transmission/reception unit 10 and those objects 90. The FFT processing unit 22 performs a Fourier transform on the signals IFS, and obtains a frequency spectrum having individual peaks (reflection powers) for each different tone. Each peak indicates that the object 90 exists at a distance d corresponding to the frequency indicated by the peak. Therefore, the distance d of the object 90 to the radar transmission/reception unit 10 is obtained.

For example, FIG. 4 shows a frequency spectrum obtained by the FFT processing unit 22 when a reflector 90A (see FIG. 5 described later) as the object 90 is placed at a distance of about 4 m in front of the radar transmission/reception unit 10, that is, it shows data (unit: dB in relative value) of the reflection power PW observed according to the distance d from the radar transmission/reception unit 10. A peak P10 appearing in FIG. 4 indicates a peak of the reflection power by the reflector 90A placed at a distance of about 4 m in front of the radar transmission/reception unit 10. The reflector 90A is a standard product formed of a metal plate having three surfaces of a regular tetrahedron with the remaining one surface (the front surface facing the radar transmission/reception unit 10) omitted and formed in a concave shape. A peak P0 appearing at a distance of zero indicates a signal component directly incident on the reception antenna 13 from the transmission antenna 12. In FIG. 4, the reflection power PW indicates the power summed over the maximum range (in this example, the field of view of ±90°) in the θ direction. In the data of the reflection power PW observed according to the distance d with respect to the direction θ connecting the radar transmission/reception unit 10 and the reflector 90A, the peak P10 of the reflection power by the reflector 90A appears at a distance of about 4 m in front of the radar transmission/reception unit 10 as in FIG. 4. In the other directions θ, the peak P10 due to the reflector 90A does not appear, and only the noise is observed besides the peak P0. As described above, by observing the peak of the reflection power for each direction θ with respect to the radar transmission/reception unit 10, the direction θ of the object 90 with respect to the radar transmission/reception unit 10 is obtained.

FIG. 3 comprehensively shows observation results obtained by the radar data processing unit 20 when the calculation results of FIG. 4 are obtained. In FIG. 3, an XYZ orthogonal coordinate system is set, with the depth direction in the horizontal plane being the Y direction, the horizontal direction being the X direction, and the vertical direction being the Z direction when viewed from the radar transmission/reception unit 10. The radar transmission/reception unit 10 is disposed at the origin of the XYZ orthogonal coordinate system with the +Y direction facing forward. In FIG. 3, a data point P10 (which is represented by the same reference numeral as the peak in FIG. 4 for easy understanding) appearing at substantially the center (a distance of about 4 m in front of the radar transmission/reception unit 10) indicates the reflector 90A as the object 90. The data points in FIG. 3 are obtained by plotting data points at which the reflection power PW is equal to or higher than a predetermined threshold value (in this example, 60 dB) (the same applies to FIGS. 6 and 11 described later). A data point P0 appearing at the origin of the XYZ orthogonal coordinate system indicates a signal component directly incident from the transmission antenna 12 to the reception antenna 13.

As described above, the radar data processing unit 20 obtains the distance d, the direction θ, and the reflection power PW of each object (object candidate) 90 with respect to the radar transmission/reception unit 10.

Figure 9B:
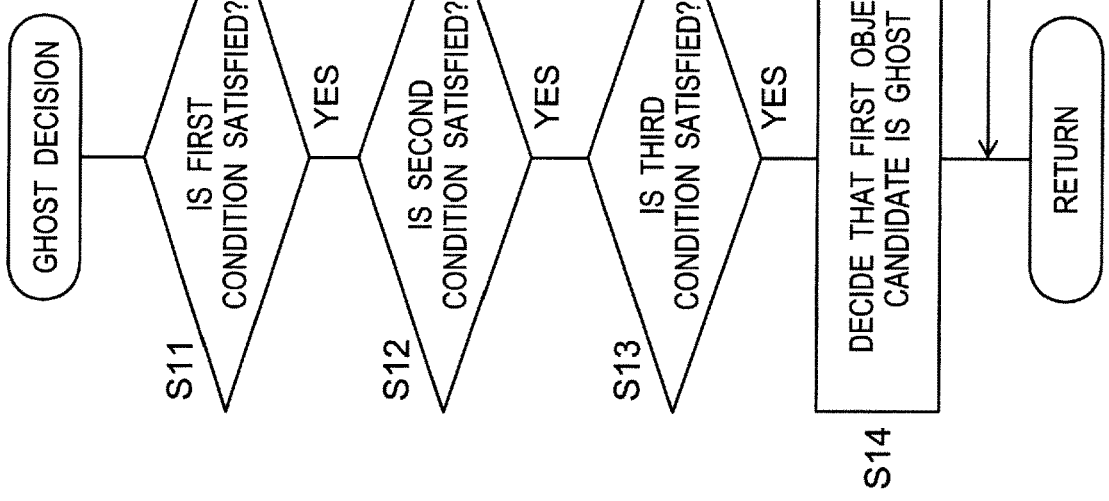
FIG. 9B is a chart specifically showing a flow of a ghost decision method included in the ghost processing method.
Figure 9A:
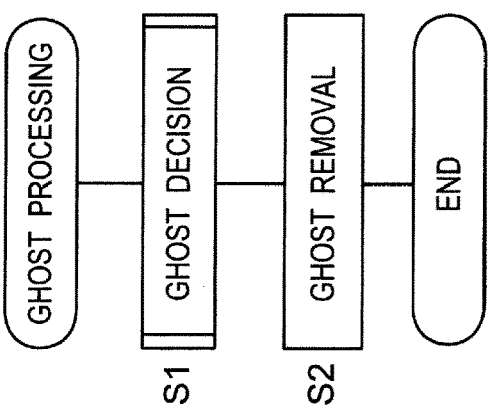
FIG. 9A is a chart showing a schematic flow of a ghost processing method executed by a ghost processing unit of the radar apparatus.

In this example, the ghost processing unit 30 shown in FIG. 1 performs a process of deciding whether or not each object candidate 90 obtained by the radar data processing unit 20 is a ghost (step S1 of FIG. 9A), and removing the object candidate decided as a ghost from the observed object candidates (step S2 of FIG. 9A). The operation of the ghost processing unit 30 will be described later in detail.

The post-stage processing unit 40 shown in FIG. 1 performs a known process of converting data processed by the ghost processing unit 30 into information necessary for the post-stage. For example, the post-stage processing unit 40 performs a clustering process of collecting detection points (a plurality of data points detected close to each other) as a cluster, a tracking process of tracking the object 90, and the like.

The data output unit 50 outputs the data processed by the post-stage processing unit 40 to an external device (for example, a display device or a computer apparatus including a display device).

Note that, components other than the ghost processing unit 30 in the radar apparatus 1, that is, the radar transmission/reception unit 10, the radar data processing unit 20, the post-stage processing unit 40, and the data output unit 50 are realized, for example, in millimeter wave sensor devices manufactured by Texas Instruments. In the example of the millimeter wave sensor device, a radar transmission/reception unit 10, a radar data processing unit 20, a post-stage processing unit 40, and a data output unit 50 are mounted on a common substrate 2. In this example, components other than the ghost processing unit 30 in the radar apparatus 1 are those of the above-described millimeter wave sensor device. In this example, the ghost processing unit 30 is configured by a microprocessor that operates according to software (computer program).

(Ghost Processing)

Figure 5:
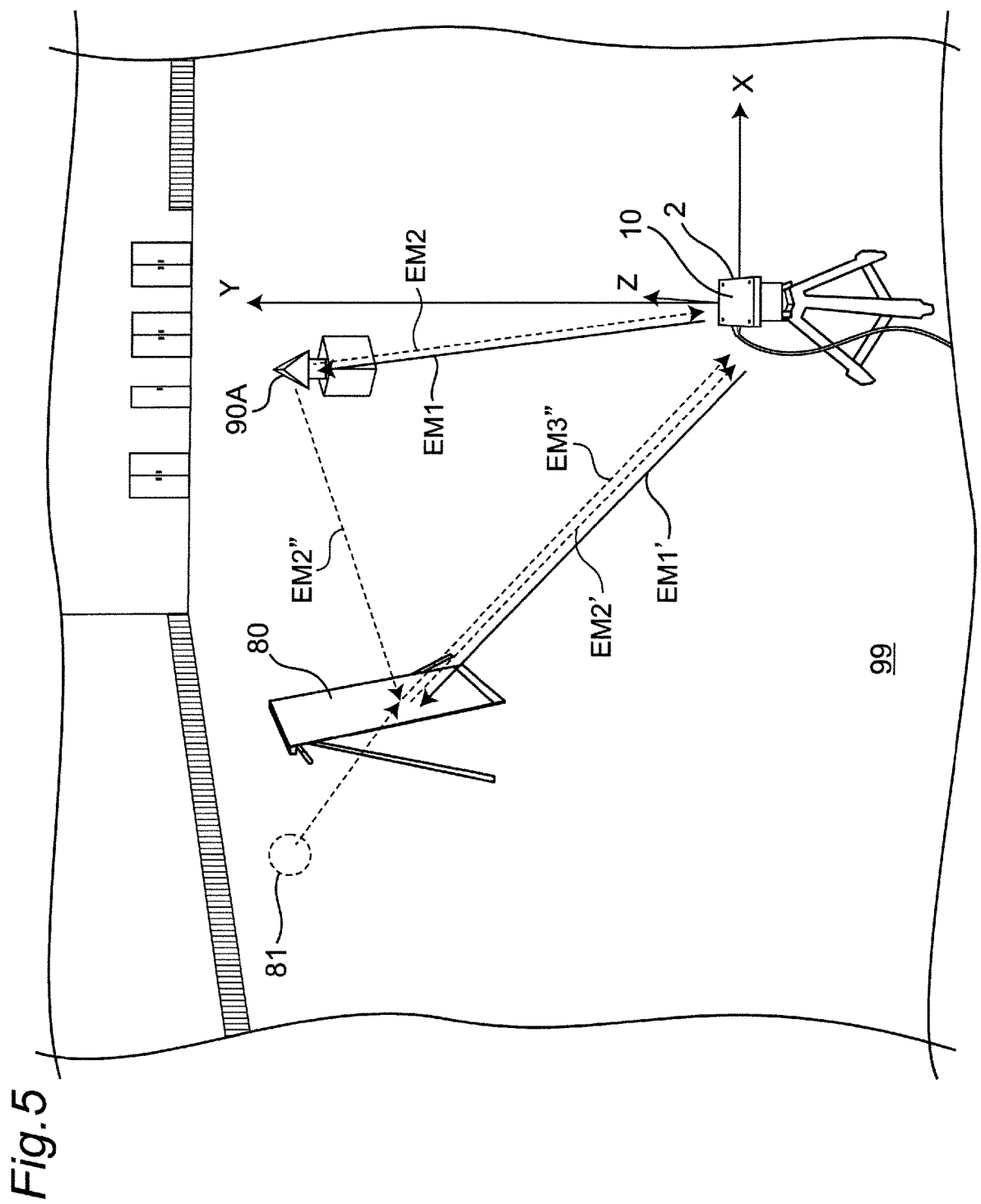
FIG. 5 is a view showing an experimental measurement environment in which object candidates observed by the radar apparatus includes a ghost.

In order to explain the ghost processing method executed by the ghost processing unit 30, FIG. 5 shows an experimental measurement environment in which an object candidate observed by the radar apparatus 1 includes a ghost.

In the example of FIG. 5, on a floor surface 99, the substrate 2 on which the radar transmission/reception unit 10 is mounted is disposed at the front. As viewed from the radar transmission/reception unit 10 on the substrate 2, an XYZ orthogonal coordinate system is set, with the depth direction in the horizontal plane being the Y direction, the horizontal direction being the X direction, and the vertical direction being the Z direction. The radar transmission/reception unit 10 is disposed at the origin of the XYZ orthogonal coordinate system with the +Y direction facing forward. Further, a reflector 90A as the object 90 is placed at a position corresponding to a distance of about 4 m substantially in front (+Y direction) of the substrate 2 (radar transmission/reception unit 10). As described above, the reflector 90A is a standard product formed of a metal plate having three surfaces of a regular tetrahedron with the remaining one surface (the front surface facing the radar transmission/reception unit 10) omitted and formed in a concave shape. In addition, a reflecting wall 80 made of a flat aluminum plate is erected at a position corresponding to a distance of about 2 m in front (+Y direction) of the substrate 2 (radar transmission/reception unit 10) and about 1.5 m to the left (−X direction) from there. The wall surface (reflection surface) of the reflecting wall 80 is oriented substantially parallel to the Y direction. In this example, for simplicity, it is assumed that the substrate 2 (radar transmission/reception unit 10), the reflector 90A, and the reflecting wall 80 are at substantially the same height level in the vertical direction.

In the measurement environment of FIG. 5, the reflector 90A reflects an electromagnetic wave EM1 transmitted from the radar transmission/reception unit 10 to generate a reflected wave EM2 toward the radar transmission/reception unit 10 and another reflected wave EM2" toward the reflecting wall 80. The reflecting wall 80 itself reflects an electromagnetic wave EM1' transmitted from the radar transmission/reception unit 10 as an object 90 to generate a reflected wave EM2' toward the radar transmission/reception unit 10. At the same time, the reflecting wall 80 reflects the reflected wave EM2" from the reflector 90A to generate a reflected wave EM3" by another path toward the radar transmission/reception unit 10. This reflected wave EM3" causes a ghost 81.

Figure 7:
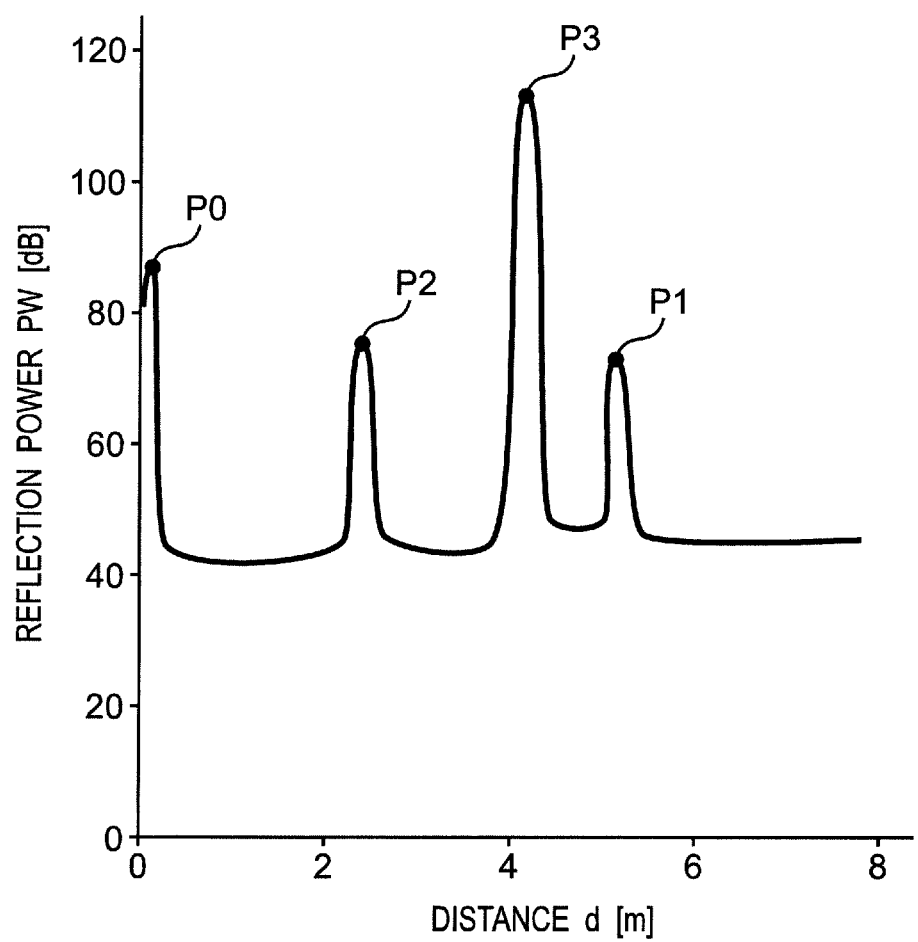
FIG. 7 is a diagram showing the reflection power (power summed in the angular direction) observed according to the distance from the radar transmission/reception unit when the observation result of FIG. 6 is obtained.

FIG. 7 shows the frequency spectrum obtained by the FFT processing unit 22 of the radar data processing unit 20, that is, data (unit: dB in relative value) of the reflection power PW observed according to the distance d from the radar transmission/reception unit 10 in the case of the measurement environment of FIG. 5. A peak P3 appearing in FIG. 7 indicates a peak of the reflection power by the reflector 90A placed at a distance of about 4 m in front of the radar transmission/reception unit 10. A peak P0 appearing at a distance of zero indicates a signal component directly incident on the reception antenna 13 from the transmission antenna 12. Note that, in FIG. 7, the reflection power PW indicates the power summed over the maximum range (in this example, the field of view of ±90°) in the θ direction, as is the same in FIG. 4. Therefore, a peak P2 due to the reflecting wall 80 appears at a distance of about 2.5 m from the radar transmission/reception unit 10. Also, a peak P1 due to the ghost 81 appears at a distance of about 5 m from the radar transmission/reception unit 10.

Figure 8A:
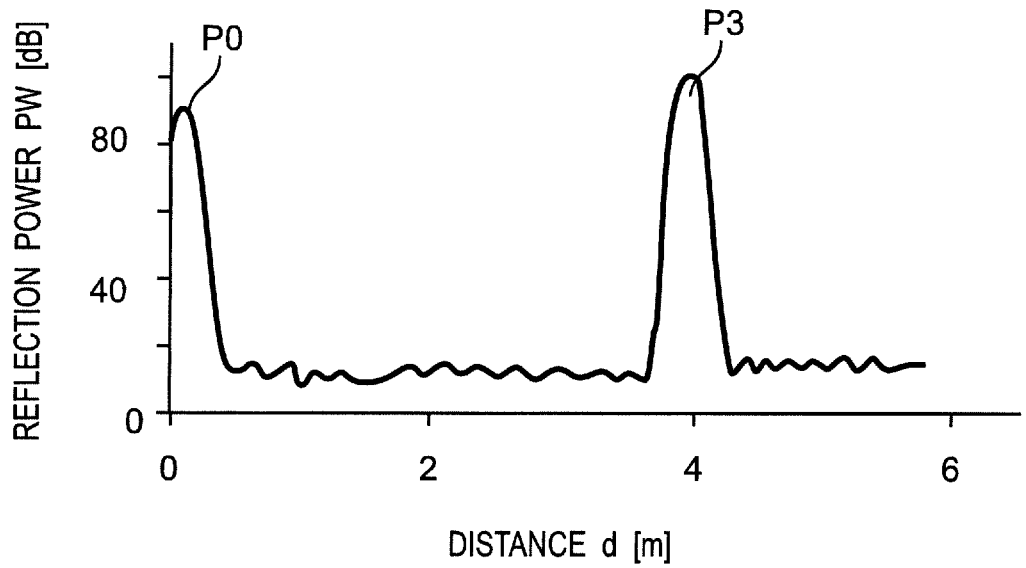
FIG. 8A is a diagram showing the reflection power observed according to the distance from the radar transmission/reception unit with respect to the direction connecting the radar transmission/reception unit and a reflector when the observation result of FIG. 7 is obtained.
Figure 8B:
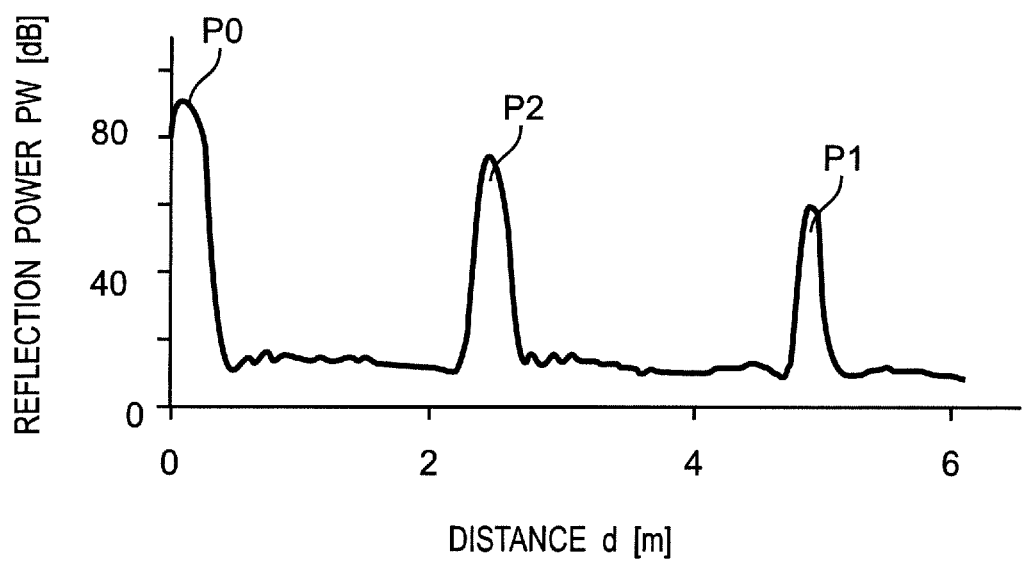
FIG. 8B is a diagram showing the reflection power observed according to the distance from the radar transmission/reception unit with respect to the direction connecting the radar transmission/reception unit and a reflecting wall when the observation result of FIG. 7 is obtained.

In the data of the reflection power PW observed according to the distance d in the direction θ connecting the radar transmission/reception unit 10 and the reflector 90A, as shown in FIG. 8A, in addition to the peak P0, only the peak P3 due to the reflector 90A appears at a distance of about 4 m from the radar transmission/reception unit 10. Further, in the data of the reflection power PW observed according to the distance d in the direction θ connecting the radar transmission/reception unit 10 and the reflecting wall 80, as shown in FIG. 8B, a peak P2 due to the reflecting wall 80 appears at a distance of about 2.5 m from the radar transmission/reception unit 10 in addition to a peak P0, and a peak P1 due to the ghost 81 appears at a distance of about 5 m from the radar transmission/reception unit 10. In the other directions θ, the peaks P1 to P3 do not appear, and only noise is observed besides the peak P0.

Figure 6:
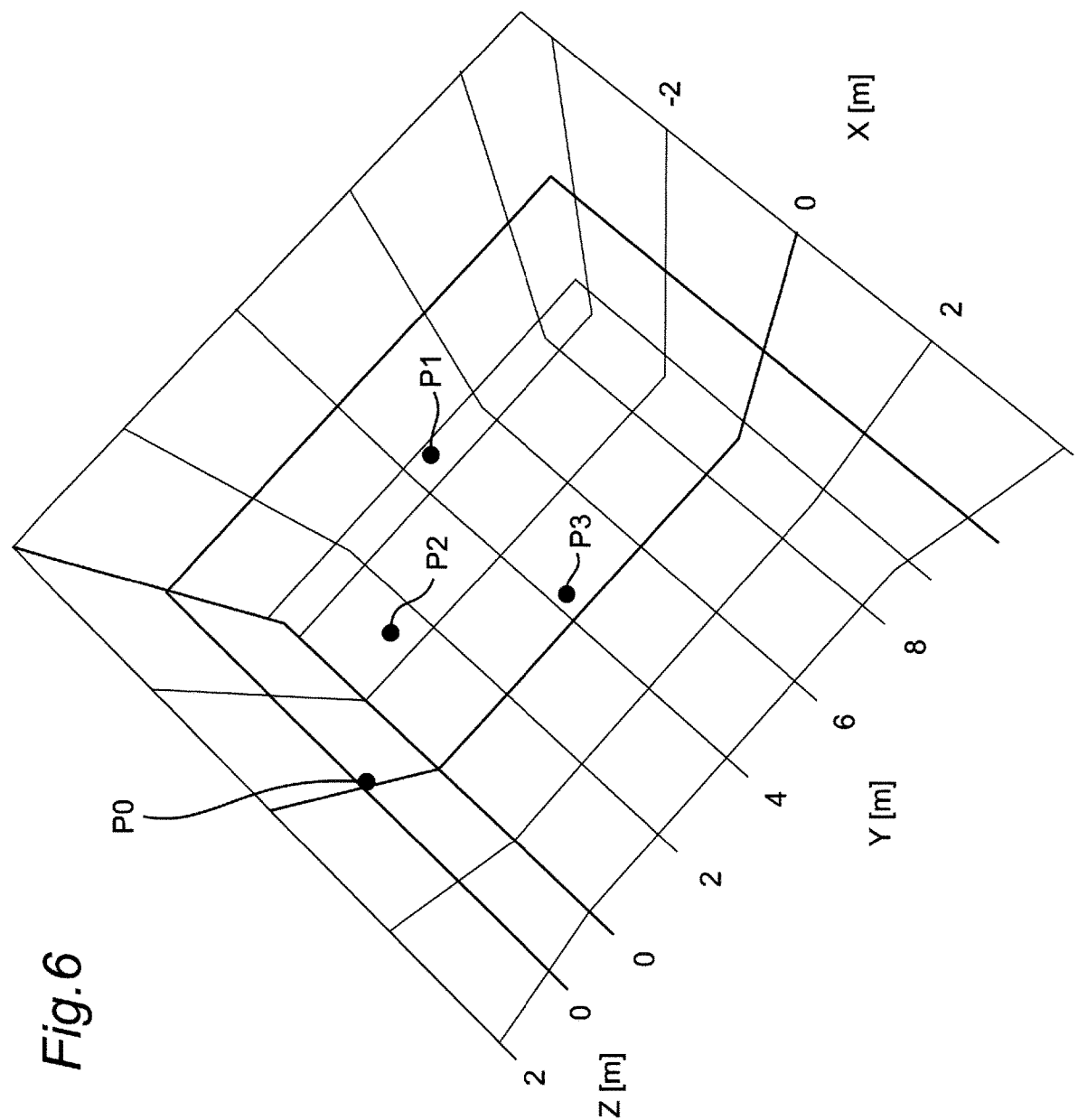
FIG. 6 is a diagram showing an observation result by the radar data processing unit of the radar apparatus in the case of the measurement environment of FIG. 5.

FIG. 6 comprehensively shows observation results obtained by the radar data processing unit 20 of the radar apparatus 1 in the case of the measurement environment of FIG. 5. In FIG. 6, a data point P3 (which is represented by the same reference numeral as the peak in FIG. 7 for easy understanding) appearing at substantially the center (a distance of about 4 m in front of the radar transmission/reception unit 10) indicates the reflector 90A as the object 90. In FIG. 6, a data point P2 appearing at a position closer to the origin of the XYZ orthogonal coordinate system than the data point P3 indicates a data point at which the reflecting wall 80 is observed as the object 90. In FIG. 6, a data point P1 appearing at a position (a position in the same direction as the data point P2 when viewed from the radar transmission/reception unit 10) separated in the horizontal direction (−X direction) from the data point P3 indicates a data point due to the ghost 81. In this example, each of these data points P1, P2, and P3 is an object candidate.

When the observation result as shown in FIG. 6 is obtained by the radar data processing unit 20, the ghost processing unit 30 acts as a ghost deciding unit and decides whether or not each of the object candidates P1, P2, and P3 is a ghost 81 according to the flow of the ghost decision method shown in FIG. 9B.

First, in step S11 of FIG. 9B, the ghost processing unit 30 acts as a first decision unit and decides whether or not a first condition (see Table 1 below) that the first object candidate and the second object candidate are in the same direction θ with respect to the radar transmission/reception unit 10 is satisfied.

Figure 10B:
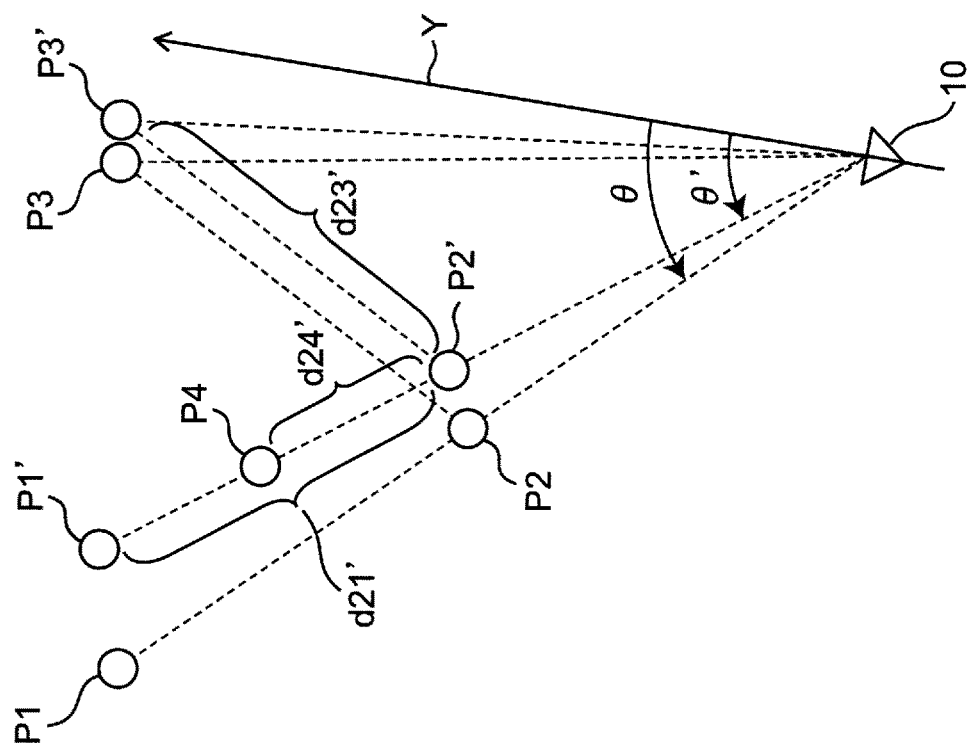
FIGS. 10A and 10B are diagrams schematically illustrating a method of deciding a ghost.
Figure 10A:
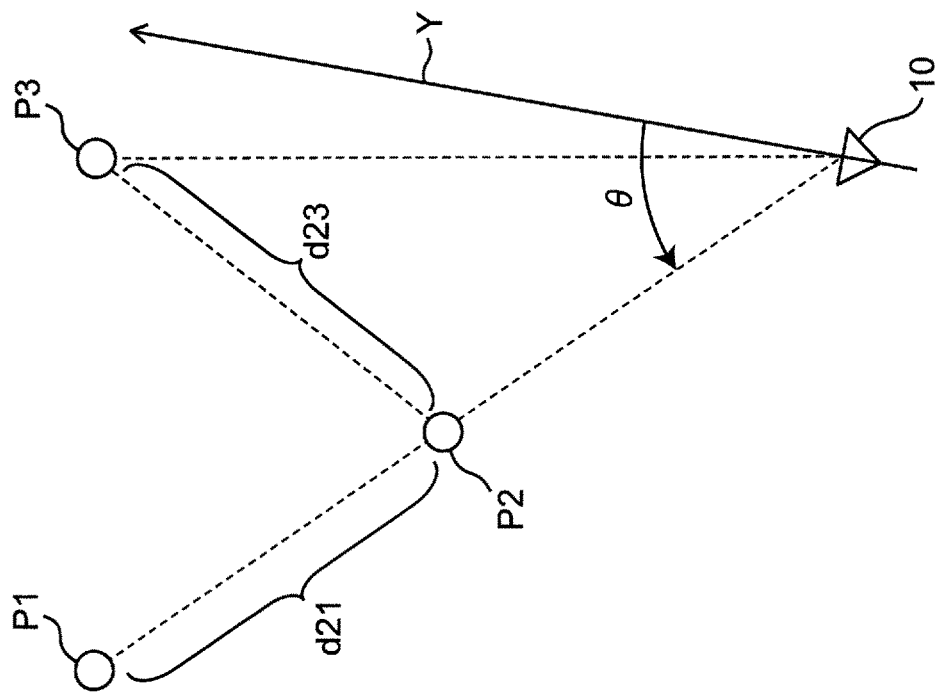

The reason for providing the first condition is that, as schematically shown in FIG. 10A, the data point P1 due to the ghost 81 always appears behind the data point P2 due to the reflecting wall 80 when viewed from the radar transmission/reception unit 10. That is, the data point P1 as the first object candidate and the data point P2 as the second object candidate appear in the same direction θ with respect to the radar transmission/reception unit 10. Therefore, in this example, in order to decide whether or not each of the object candidates P1, P2, and P3 is a ghost 81, first, it is decided whether or not the first condition that the first object candidate and the second object are in the same direction θ with respect to the radar transmission/reception unit 10 is satisfied.

In the example of FIG. 10A, among the object candidates P1, P2, and P3, the object candidates P1 and P2 are in the same direction 9 as viewed from the radar transmission/reception unit 10. Therefore, it is decided that the first condition is satisfied for the object candidates P1 and P2. On the other hand, the object candidate P3 exists alone in a different direction from the object candidates P1 and P2. Therefore, it is decided that the first condition is not satisfied for the object candidate P3.

When the first condition is satisfied, in step S12 of FIG. 9B, the ghost processing unit 30 acts as a second decision unit and decides whether or not a second condition (see Table 1 below) that of the first and second object candidates, the reflection power from the first object candidate located farther away from the radar transmission/reception unit 10 is smaller the reflection power from the second object candidate located closer to the radar transmission/reception unit 10 is satisfied.

The reason for providing the second condition is that, as shown in FIG. 5, since the optical path length of the indirect reflected waves EM2" to EM3" from the reflector 90A via the reflecting wall 80 is longer than the optical path length of the direct reflected wave EM2' from the reflecting wall 80, and the number of reflections (two times) of the indirect reflected waves EM2" to EM3" from the reflector 90A via the reflecting wall 80 is larger than the number of reflections (one time) of the direct reflected wave EM2' from the reflecting wall 80, the reflection power of the indirect reflected wave EM3" from the reflector 90A via the reflecting wall 80 becomes always smaller than the reflection power of the direct reflected wave EM2' from the reflecting wall 80.

In the example in which the observation result shown in FIG. 6 is obtained, as can be seen from FIG. 8B, of the first and second object candidates P1 and P2, the reflection power from the first object candidate P1 located farther away from the radar transmission/reception unit 10 is smaller than the reflection power from the second object candidate P2 located closer to the radar transmission/reception unit 10. Therefore, it is decided that the second condition is satisfied, using the data point P1 as the first object candidate and the data point P2 as the second object candidate in FIG. 6.

When the first and second conditions are satisfied, the ghost processing unit 30 acts as a third decision unit in step S13 of FIG. 9B and decides whether or not a third condition (see Table 1 below) that a third object candidate exists in a different direction from the first and second object candidates with respect to the radar transmission/reception unit 10, and the distance from the second object candidate to the first object candidate is equal to the distance from the second object candidate to the third object candidate is satisfied.

The reason for providing the third condition is that, as schematically shown in FIG. 10A, the third object candidate P3 by the reflector 90A and the first object candidate P1 by the ghost 81 derived therefrom always appear to be plane-symmetric with respect to the reflecting wall 80 forming the second object candidate P2 (the reflection surface of the reflecting wall 80 is oriented substantially in parallel with the Y direction). In such a plane-symmetric arrangement, a distance d21 from the second object candidate P2 to the first object candidate P1 is equal to a distance d23 from the second object candidate P2 to the third object candidate P3. Therefore, in this example, it is decided whether or not such a third object candidate P3 exists. This supports that the first object candidate P1 as a ghost is derived from the existence of the third object candidate P3. Therefore, the accuracy in deciding whether or not the observed object candidate is a ghost is increased.

In the example of FIG. 10A, the third object candidate P3 exists in a different direction from the first and second object candidates P1 and P2, and the distance d21 from the second object candidate P2 to the first object candidate P1 is equal to the distance d23 from the second object candidate P2 to the third object candidate P3. That is, d21=d23. Therefore, it is decided that the third condition is satisfied.

TABLE 1

Decision condition table

| Conditions | Contents |
| --- | --- |
| First condition | The first object candidate and the second object candidate are in the same direction θ with respect to the radar transmission/reception unit 10. |
| Second condition | Of the first and second object candidates, the reflection power from the first object candidate located farther away from the radar transmission/reception unit 10 is smaller than the reflection power from the second object candidate located closer to the radar transmission/reception unit 10 |
| Third condition | The third object candidate exists in a different direction from the first and second object candidates with respect to the radar transmission/reception unit 10, and the distance from the second object candidate to the first object cadidate is equal to the distance from the second object candidate to the third object candidate. |

Only when the first, second, and third conditions are satisfied, as shown in step S14 of FIG. 9B, the ghost processing unit 30 acts as a ghost deciding unit and decides that the first object candidate P1 is a ghost 81. On the other hand, if any of the first, second, and third conditions is not satisfied, as shown in step S15 of FIG. 9B, the ghost processing unit 30 decides that the first object candidate P1 is an original object (not a ghost).

Further, when the object candidates P1, P2, and P3 observed by the radar data processing unit 20 form a group (data point group), the ghost processing unit 30 decides whether or not they correspond to the ghost 81, as follows.

For example, it is assumed that as shown in FIG. 10B, an object candidate P1' exists at a position slightly separated to the right from the object candidate P1, and object candidates P2' and P3' exist at positions slightly separated to the right from the object candidates P2 and P3, respectively. In this case, the object candidates P1' and P2' are in the same direction θ' as viewed from the radar transmission/reception unit 10. Therefore, it is decided that the first condition is satisfied for the object candidates P1' and P2' (YES in step S11 of FIG. 9B). In addition, although not shown, it is assumed that of the first and second object candidates P1' and P2', the reflection power from the first object candidate P1' located farther away from the radar transmission/reception unit 10 is smaller than the reflection power from the second object candidate P2' located closer to the radar transmission/reception unit 10. Thereby, it is decided that the second condition is satisfied (YES in step S12 of FIG. 9B). Further, as shown in FIG. 10B, a third object candidate P3' exists in a different direction from the first and second object candidates P1' and P2', and a distance d21' from the second object candidate P2' to the first object candidate P1' is equal to a distance d23' from the second object candidate P2' to the third object candidate P3'. That is, d21'=d23'. Therefore, it is decided that the third condition is satisfied (YES in step S13 of FIG. 9B). As a result, it is decided that the object candidate P1' corresponds to the ghost 81 (step S14 of FIG. 9B).

On the other hand, as shown in FIG. 10B, it is assumed that another object candidate P4 exists at a position corresponding to the middle between the object candidate P2' and the object candidate P1' on a line connecting the object candidate P2' and the object candidate P1'. In this case, the object candidates P4 and P2' are in the same direction θ' as viewed from the radar transmission/reception unit 10. Therefore, it is decided that the first condition is satisfied for the object candidates P4 and P2' (YES in step S11 of FIG. 9B). Although not shown, it is assumed that of the first and second object candidates P4 and P2', the reflection power from the first object candidate P4 located farther away from the radar transmission/reception unit 10 is smaller than the reflection power from the second object candidate P2' located closer to the radar transmission/reception unit 10. Thereby, it is decided that the second condition is satisfied (YES in step S12 of FIG. 9B). However, in the example of FIG. 10B, there is no third object candidate to be given a distance equal to the distance d24' from the second object candidate P2' to the first object candidate P4. Therefore, it is decided that the third condition is not satisfied (NO in step S13 of FIG. 9B). As a result, the object candidate P4 is decided as the original object (not a ghost) (step S15 of FIG. 9B).

Thus, according to the ghost processing unit 30 of the radar apparatus 1, it is possible to decide whether or not each of the observed object candidates P1, P1', . . . ; P2, P2', . . . ; P3, P3', . . . is a ghost 81.

Note that in the flow of FIG. 9B, the reason why the decision whether or not the first condition is satisfied (step S11) is made before the decision whether or not the second condition is satisfied (step S12) is that the decision whether or not the first condition is satisfied (decision based on only the direction ω) requires a smaller amount of calculation processing than the decision whether or not the second condition is satisfied (decision based on the distance d and the reflection power PW). That is, it is because if the decision whether or not the first condition is satisfied is made first and the number of processing targets is reduced, the processing load on the microprocessor can be reduced as a whole. Similarly, the reason why the decision whether or not the first and second conditions are satisfied (steps S11 and S12) is made before the decision whether or not the third condition is satisfied (step S13) is that the decision whether or not the first and second conditions are satisfied requires a smaller amount of calculation processing than the decision whether or not the third condition is satisfied (calculation of the distance from the second object candidate to the first object candidate and calculation of the distance from the second object candidate to the third object candidate are included.) That is, it is because if the decision whether or not the first and second conditions are satisfied is made first and the number of processing targets is reduced, the processing load on the microprocessor can be reduced as a whole.

In this example, the ghost processing unit 30, after deciding whether or not each of the observed object candidates (for simplicity, P1, P2, and P3 shown in FIG. 6) is a ghost 81, acts as a ghost removing unit and performs a process of removing the object candidate (P1 in the above example) decided as the ghost 81 from the observed object candidates P1, P2, and P3 (step S2 of FIG. 9A).

Figure 11:
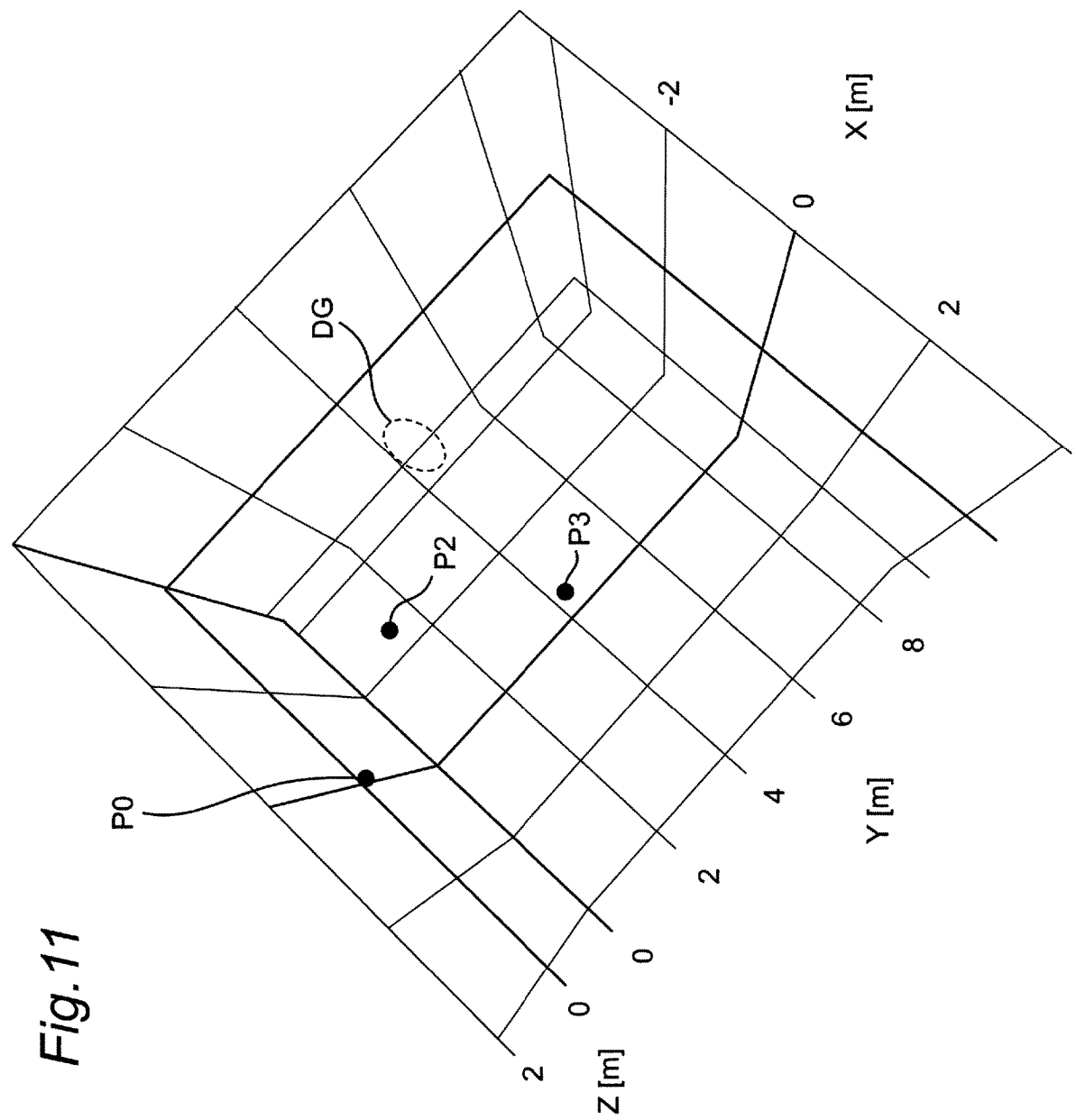
FIG. 11 is a diagram showing an output example of the radar apparatus when a ghost is removed in FIG. 6.

Specifically, as illustrated in FIG. 11 corresponding to FIG. 6, the ghost processing unit 30 creates data Dout in which the object candidate P1 decided as the ghost 81 is removed from the observed object candidates 21, P2, and P3, and outputs the created data Dout to the external display device (or a substantial computer apparatus having a display device) via the post-stage processing unit 40 and the data output unit 50 shown in FIG. 1.

In the example of FIG. 11, the data point P1 due to the ghost 81 that appeared in the area indicated by the broken line ellipse DG has been removed as compared with FIG. 6. Therefore, the radar apparatus 1 can output only the data indicating the original object 90 (in this example, the data point P3 due to the reflector 90A and the data point P2 due to the reflecting wall 80).

(Modification)

In the above example, the object candidate P1 decided as the ghost 81 is removed from the observed object candidates P1, P2, and P3, but the present invention is not limited to this. For example, the ghost processing unit 30 may act as a display processing unit and create display data for displaying the data points by changing the display mode of the data point P1 decided as the ghost 81 from the display mode of the data points P2 and P3 indicating the original object 90, such as displaying the data points P2 and P3 indicating the original object 90 in blue, while displaying the data point P1 decided as the ghost 81 in red (or gray). In such a case, the user, by looking at the display based on the display data, can intuitively distinguish and grasp the object candidate P1 decided as the ghost 81 from the remaining object candidates P2 and P3 among the observed object candidates P1, P2, and P3.

The ghost processing unit 30 described above is configured by a microprocessor that operates according to software (computer program). However, the present invention is not limited to this, and the ghost processing unit 30 may be configured by a logic circuit (integrated circuit) such as a Programmable Logic Device (PLD) and a Field Programmable Gate Array (FPGA). Further, the ghost processing unit 30 may be incorporated in a commercially available millimeter wave sensor device, for example.

The above-mentioned ghost decision method (or ghost processing method) may be recorded as software (computer program) on a recording medium capable of storing data in a non-transitory manner, such as compact disc (CD), digital universal disc (DVD), or flash memory. It is possible to cause a computer apparatus to execute the ghost decision method (or ghost processing method) described above by installing the software recorded on such a recording medium in the substantial computer apparatus such as a personal computer, a Personal Digital Assistance (PDA), or a smartphone.

As described above, the radar apparatus according to the present disclosure is a radar apparatus that measures a distance and a direction from a transmission/reception unit to an object by emitting an electromagnetic wave from the transmission/reception unit toward the object and observing a reflected wave from the object, the radar apparatus including:

a candidate specifying unit that obtains a distance, a direction, and a reflection power of each object candidate with respect to the transmission/reception unit based on the reflected wave; and a ghost deciding unit that decides whether or not each object candidate is a ghost, in which the ghost deciding unit includes:

a first decision unit that decides whether or not a first condition that a first object candidate and a second object candidate are in the same direction with respect to the transmission/reception unit is satisfied, and a second decision unit that decides whether or not a second condition that, of the first and second object candidates, a reflection power from the first object candidate located farther away from the transmission/reception unit is smaller than a reflection power from the second object candidate located closer to the transmission/reception unit is satisfied, and decides that only when the first condition and the second condition are satisfied, the first object candidate is a ghost.

In this specification, a "radar apparatus" generally means an apparatus that measures a distance and a direction to an object by emitting an electromagnetic wave toward the object and observing a reflected wave from the object. In the present invention, the electromagnetic wave is typically a millimeter wave or a microwave, but is not limited thereto, and may have a longer wavelength or a shorter wavelength (for example, light).

"Ghost" means a result (or erroneously detected data) of having erroneously detected an object (object) as if it had existed even though it does not exist. For example, a ghost occurs when a reflected wave from an object reaches a radar apparatus through multipath (caused by the presence of a reflecting wall or the like).

In the radar apparatus according to the present disclosure, the transmission/reception unit emits an electromagnetic wave toward an object and observes a reflected wave from the object. The candidate specifying unit obtains a distance, a direction, and a reflection power of each object candidate with respect to the transmission/reception unit based on the reflected wave. The first decision unit included in the ghost deciding unit decides whether or not the first condition that the first object candidate and the second object candidate are in the same direction with respect to the transmission/reception unit is satisfied. The second decision unit decides whether or not the second condition that, of the first and second object candidates, the reflection power from the first object candidate located farther away from the transmission/reception unit is smaller than the reflection power from the second object candidate located closer to the transmission/reception unit is satisfied. The ghost deciding unit decides that the first object candidate is a ghost only when the first condition and the second condition are satisfied. The ghost deciding unit decides whether or not each object candidate corresponds to a ghost as the first object candidate. In this way, according to this radar apparatus, it is possible to decide whether or not the observed object candidate is a ghost.

In the radar apparatus according to one embodiment, the ghost deciding unit
includes a third decision unit that decides whether or not a third condition that a third object candidate exists in a different direction from the first and second object candidates with respect to the transmission/reception unit, and a distance from the second object candidate to the first object candidate is equal to a distance from the second object candidate to the third object candidate is satisfied, and
decides that the first object candidate is a ghost only when the third condition, in addition to the first and second conditions, is satisfied.

When the first object candidate is a ghost, it is highly possible that the second object candidate is a reflecting wall that reflects the electromagnetic wave incident from the third object candidate toward the transmission/reception unit. Therefore, in the radar apparatus according to the embodiment, the third decision unit included in the ghost deciding unit decides whether or not the third condition that the third object candidate exists in a different direction from the first and second object candidates with respect to the transmission/reception unit, and a distance from the second object candidate to the first object candidate is equal to a distance from the second object candidate to the third object candidate is satisfied. When the third condition is satisfied, it is supported that the first object candidate as a ghost is derived from the presence of the third object candidate. Therefore, the accuracy in deciding whether or not the observed object candidate is a ghost is increased.

In the radar apparatus according to one embodiment, the radar apparatus further includes a ghost removing unit that performs a process of removing the object candidate decided as a ghost by the ghost deciding unit from the object candidates obtained by the candidate specifying unit.

In the radar apparatus according to the embodiment, the ghost removing unit performs a process of removing the object candidate decided as a ghost by the ghost deciding unit from the object candidates obtained by the candidate specifying unit. Therefore, this radar apparatus can output only data indicating the original object.

In the radar apparatus according to one embodiment, the radar apparatus further includes a display processing unit that creates display data to be displayed in such a manner that among the object candidates obtained by the candidate specifying unit, a display mode for the object candidate decided as a ghost by the ghost deciding unit is changed from a display mode for the remaining object candidates.

In the radar apparatus according to one embodiment, the user, by looking at the display based on the display data, can intuitively distinguish and grasp, among the object candidates obtained by the candidate specifying unit, the object candidate decided as a ghost by the ghost deciding unit from the remaining object candidates.

In another aspect, the ghost decision method of the present disclosure is a ghost decision method for a radar apparatus that measures a distance and a direction from a transmission/reception unit to an object by emitting an electromagnetic wave from the transmission/reception unit toward the object and observing a reflected wave from the object, in which
the radar apparatus includes a candidate specifying unit that obtains, based on the reflected wave, a distance, a direction, and a reflection power of each object candidate with respect to the transmission/reception unit,
the ghost decision method
decides whether or not a first condition that a first object candidate and a second object candidate are in the same direction with respect to the transmission/reception unit is satisfied,
decides whether or not a second condition that of the first and second object candidates, a reflection power from the first object candidate located farther away from the transmission/reception unit is smaller than a reflection power from the second object candidate located closer to the transmission/reception unit is satisfied, and
decides that only when the first condition and the second condition are satisfied, the first object candidate is a ghost, and
thereby decides whether or not each of the object candidates corresponds to a ghost as the first object candidate.

In advance, the transmission/reception unit of the radar apparatus emits an electromagnetic wave toward the object and observes a reflected wave from the object. The candidate specifying unit obtains a distance, a direction, and a reflection power of each object candidate with respect to the transmission/reception unit based on the reflected wave. The ghost decision method according to the present disclosure first decides whether or not a first condition that a first object candidate and a second object candidate are in the same direction with respect to the transmission/reception unit is satisfied. Next, it is decided whether or not a second condition that of the first and second object candidates, the reflection power from the first object candidate located farther away from the transmission/reception unit is smaller than the reflection power from the second object candidate located closer to the transmission/reception unit is satisfied. Then, it is decided that only when the first condition and the second condition are satisfied, the first object candidate is a ghost. In this way, it is decided whether or not each of the object candidates corresponds to a ghost as the first object candidate. Thus, according to the ghost decision method, it is possible to decide whether or not the object candidate observed by the radar apparatus is a ghost.

In yet another aspect, a computer-readable recording medium according to the present disclosure is a computer-readable recording medium non-transitorily storing a program for causing a computer to execute the ghost decision method.

By making a computer read a program stored in a computer-readable recording medium according to the present disclosure and causing the computer to execute the program, it becomes possible to implement the ghost decision method.

As is clear from the above, according to the radar apparatus and the ghost decision method of the present disclosure, it is possible to decide whether or not the observed object candidate is a ghost. Furthermore, by making a computer read the program stored in a computer-readable recording medium according to the present disclosure and causing the computer to execute the program, it becomes possible to implement the ghost decision method.

The above embodiments are illustrative, and are modifiable in a variety of ways without departing from the scope of this invention. It is to be noted that the various embodiments described above can be appreciated individually within each embodiment, but the embodiments can be combined together. It is also to be noted that the various features in different embodiments can be appreciated individually by its own, but the features in different embodiments can be combined.

The invention claimed is:

1. A radar apparatus that measures a distance and a direction from a transmission/reception unit to an object by emitting an electromagnetic wave from the transmission/reception unit toward the object and observing a reflected wave from the object, the radar apparatus including a processor or logic circuit configured to perform operations comprising:

operation as a candidate specifying unit that obtains a distance, a direction, and a reflection power of each object candidate with respect to the transmission/reception unit based on the reflected wave; and operation as a ghost deciding unit that decides whether or not each object candidate is a ghost, in which the ghost deciding unit includes:

operation as a first decision unit that decides whether or not a first condition that a first object candidate and a second object candidate are in a same direction with respect to the transmission/reception unit is satisfied, and, when it is decided that the first condition is not satisfied, decides that the first object candidate is the object, and ends processing for the first object candidate;

operation as a second decision unit that decides, only when it is decided that the first condition is satisfied, whether or not a second condition that, of the first and second object candidates, a reflection power from the first object candidate located farther away from the transmission/reception unit is smaller than a reflection power from the second object candidate located closer to the transmission/reception unit is satisfied, and, when it is decided that the second condition is not satisfied, decides that the first object candidate is the object, and ends processing for the first object candidate; and operation as a third decision unit that decides, only when it is decided that the second condition is satisfied, whether or not a third condition that a third object candidate exists in a different direction from the first and second object candidates with respect to the transmission/reception unit, and a distance from the second object candidate to the first object candidate is equal to a distance from the second object candidate to the third object candidate is satisfied, and decides using solely decision results for the first condition, the second condition and the third condition, that the first object candidate is a ghost only when the third condition is satisfied in addition to the first condition and the second condition.

2. The radar apparatus according to claim 1, wherein the processor or logic circuit is configured to perform operations further comprising:

operation as a ghost removing unit that performs a process of removing the first object candidate decided as a ghost by the ghost deciding unit from object candidates obtained by the candidate specifying unit.

3. The radar apparatus according to claim 1, wherein the processor or logic circuit is configured to perform operations further comprising:

operation as a display processing unit that creates display data to be displayed in such a manner that among object candidates obtained by the candidate specifying unit, a display mode for the first object candidate decided as a ghost by the ghost deciding unit is changed from a display mode for the remaining object candidates.

4. A ghost decision method for a radar apparatus that measures a distance and a direction from a transmission/reception unit to an object by emitting an electromagnetic wave from the transmission/reception unit toward the object and observing a reflected wave from the object, in which the radar apparatus includes a candidate specifying unit that obtains, based on the reflected wave, a distance, a direction, and a reflection power of each object candidate with respect to the transmission/reception unit, the ghost decision method decides whether or not a first condition that a first object candidate and a second object candidate are in a same direction with respect to the transmission/reception unit is satisfied, and, when it is decided that the first condition is not satisfied, decides that the first object candidate is the object, and ends processing for the first object candidate;

decides, only when it is decided that the first condition is satisfied, whether or not a second condition that of the first and second object candidates, a reflection power from the first object candidate located farther away from the transmission/reception unit is smaller than a reflection power from the second object candidate located closer to the transmission/reception unit is satisfied, and, when it is decided that the second condition is not satisfied, decides that the first object candidate is the object, and ends processing for the first object candidate;

decides, only when it is decided that the second condition is satisfied, whether or not a third condition that a third object candidate exists in a different direction from the first and second object candidates with respect to the transmission/reception unit, and a distance from the second object candidate to the first object candidate is equal to a distance from the second object candidate to the third object candidate is satisfied; and decides, using solely decision results for the first condition, the second condition and the third condition, that the first object candidate is a ghost only when the third condition is satisfied in addition to the first condition and the second condition, and thereby decides whether or not each of object candidates corresponds to a ghost as the first object candidate.

5. A non-transitory computer-readable medium storing a program for causing a computer to execute a ghost decision method for a radar apparatus that measures a distance and a direction from a transmission/reception unit to an object by emitting an electromagnetic wave from the transmission/reception unit toward the object and observing a reflected wave from the object, in which the radar apparatus includes a candidate specifying unit that obtains, based on the reflected wave, a distance, a direction, and a reflection power of each object candidate with respect to the transmission/reception unit, the ghost decision method decides whether or not a first condition that a first object candidate and a second object candidate are in a same direction with respect to the transmission/reception unit is satisfied, and, when it is decided that the first condition is not satisfied, decides that the first object candidate is the object, and ends processing for the first object candidate;

decides, only when it is decided that the first condition is satisfied, whether or not a second condition that of the first and second object candidates, a reflection power from the first object candidate located farther away from the transmission/reception unit is smaller than a reflection power from the second object candidate located closer to the transmission/reception unit is satisfied, and, when it is decided that the second condition is not satisfied, decides that the first object candidate is the object, and ends processing for the first object candidate;

decides, only when it is decided that the second condition is satisfied, whether or not a third condition that a third object candidate exists in a different direction from the first and second object candidates with respect to the transmission/reception unit, and a distance from the second object candidate to the first object candidate is equal to a distance from the second object candidate to the third object candidate is satisfied; and decides, using solely decision results for the first condition, the second condition and the third condition, that the first object candidate is a ghost only when the third condition is satisfied in addition to the first condition and the second condition, and thereby decides whether or not each of object candidates corresponds to a ghost as the first object candidate.

* * * * *